(12) United States Patent
Omata

(10) Patent No.: US 10,965,838 B2
(45) Date of Patent: Mar. 30, 2021

(54) IMAGE FORMING APPARATUS, METHOD FOR CONTROLLING IMAGE FORMING APPARATUS, AND NON-TRANSITORY STORAGE MEDIUM FOR RESTRICTING A FUNCTION

(71) Applicant: CANON KABUSHIKI KAISHA, Tokyo (JP)

(72) Inventor: Jun Omata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/692,887

(22) Filed: Nov. 22, 2019

(65) Prior Publication Data

US 2020/0177766 A1 Jun. 4, 2020

(30) Foreign Application Priority Data

Nov. 30, 2018 (JP) .............................. JP2018-225482

(51) Int. Cl.
  *G06F 3/12* (2006.01)
  *H04N 1/44* (2006.01)
  *H04N 1/00* (2006.01)

(52) U.S. Cl.
  CPC ....... *H04N 1/4433* (2013.01); *H04N 1/00411* (2013.01); *H04N 1/00514* (2013.01)

(58) Field of Classification Search
  None
  See application file for complete search history.

(56) References Cited

U.S. PATENT DOCUMENTS

| | | | | |
|---|---|---|---|---|
| 10,257,388 | B2* | 4/2019 | Hosoda | H04N 1/00464 |
| 2012/0260350 | A1* | 10/2012 | Yamada | H04N 1/00411 |
| | | | | 726/28 |
| 2013/0347097 | A1* | 12/2013 | Pan | G06F 21/31 |
| | | | | 726/17 |
| 2015/0172504 | A1* | 6/2015 | Sato | H04N 1/32021 |
| | | | | 358/1.13 |
| 2017/0264775 | A1* | 9/2017 | Ikeda | H04N 1/00482 |
| 2018/0063376 | A1* | 3/2018 | Ohara | H04N 1/00482 |

FOREIGN PATENT DOCUMENTS

JP  2017-163417 A  9/2017

* cited by examiner

*Primary Examiner* — Henok Shiferaw
(74) *Attorney, Agent, or Firm* — Canon U.S.A., Inc. IP Division

(57) ABSTRACT

When at least one application of copy, scan, and fax applications installed in an image forming apparatus is enabled, execution of a function corresponding to the enabled application is restricted.

13 Claims, 7 Drawing Sheets

FIG. 3

| *** COPY | | | ? | LOGOUT |
|---|---|---|---|---|
| MAGNIFICATION | PAPER SHEET | DENSITY | | NUMBER OF COPIES |
| 100% | 1  A4 | ±0 | | 1 |
| PREVIEW | DOUBLE-SIDED: OFF  OFF \| SINGLE-DOUBLE \| DOUBLE-DOUBLE \| DOUBLE-SINGLE | | | MONOCHROME START |
| | PAGE AGGREGATION: OFF  OFF \| 2_1 \| 4_1 | | | COLOR START |
| | OTHER SETTINGS | | | |
| < STATUS ROW > | | | | CHECK STATUS |

501 APPLICATION MANAGEMENT  LAST-UPDATED: 2018 11/20 11:59:45

NO BUTTON IS DISPLAYED WHEN HOME SCREEN HAS NO REGISTRABLE SPACE UPON ENABLING OF APPLICATION.
FREE SPACE ON STORAGE: 448MB

| APPLICATION NAME | VERSION | TOTAL SIZE | STATUS | OPERATION |
|---|---|---|---|---|
| SAVING COPY | 0100 | — | ENABLED [DISABLED] | [RESET] |
| STORE AFTER FAX | 0100 | 6.07MB | ENABLED [DISABLED] | [RESET] |

505

502

APPLICATION MANAGEMENT
BUTTON DISPLAY SETTINGS ON HOME SCREEN

SAVING COPY > BUTTON'S DETAILED INFORMATION > EDIT BUTTON
EDIT BUTTON

BUTTON'S DETAILED INFORMATION
BASIC SETTINGS
 □ CHANGE BUTTON'S NAME
   BUTTON'S NAME: [SAVING COPY]   (UP TO 20 CHARACTERS)
 ☑ DISPLAY CONFIRMATION SCREEN BEFORE EXECUTION

NORMAL COPY SETTINGS

503

COPY SETTINGS
 NUMBER OF COPIES:  ○ ENABLED
                    ● DISABLED
                    ○ ENABLED ONLY FOR SYSTEM ADMINISTRATOR
                    [1]  (1 TO 999)
 DENSITY: [0 ▼]
 BACKGROUND ADJUSTMENT:  ○ AUTO
                         ● ADJUST
 ADJUST: [0 ▼]

[OK] [CANCEL]

504

IMAGE FORMING APPARATUS, METHOD FOR CONTROLLING IMAGE FORMING APPARATUS, AND NON-TRANSITORY STORAGE MEDIUM FOR RESTRICTING A FUNCTION

BACKGROUND

Field of the Disclosure

The present disclosure relates to an image forming apparatus, a method for controlling an image forming apparatus, and a non-transitory storage medium.

Description of the Related Art

Some image forming apparatuses may execute, besides a menu for executing existing functions such as copying and faxing as their functions, copying, faxing, and the like using applications that are installable therein later. One example of such applications that may be incorporated into an image forming apparatus is the "store after fax" application. This "store after fax" application is a function that, after transmitting a fax, transmits the fax to a destination that is other than the recipient of the fax and that is set in advance by the application, and saves the transmitted fax image. It is assumed that the image transmitted by fax is saved in a server and managed as part of a log (Japanese Patent Laid-Open No. 2017-163417).

Transition to the above-described application may be made with a button different from existing functions such as copying and faxing, and normal copying, faxing, and the like may be used as they are. Therefore, although the administrator wants the user to use copy and fax applications rather than the existing functions, the user may prefer to use the existing functions.

SUMMARY

According to some embodiments, an image forming apparatus includes: a display unit configured to display a screen on which copy, scan, and fax functions are selectable; and a control unit configured to, in a case where at least one application of copy, scan, and fax applications is installed in addition to the functions and the application is enabled, restrict execution of a function corresponding to the application.

Further features of the present disclosure will become apparent from the following description of exemplary embodiments with reference to the attached drawings.

BRIEF DESCRIPTION OF THE DRAWINGS

FIG. 3 illustrates an example of a screen for copying using an existing function in the present embodiment.

FIG. 5 illustrates an example of a screen for changing the application settings in the present embodiment.

DESCRIPTION OF THE EMBODIMENTS

Hereinafter, embodiments of the present disclosure will be described in detail with reference to the accompanying drawings. Note that the following embodiments are not construed to limit the present disclosure, and all combinations of the features described in the present embodiments are not necessarily required.

Figure 1:
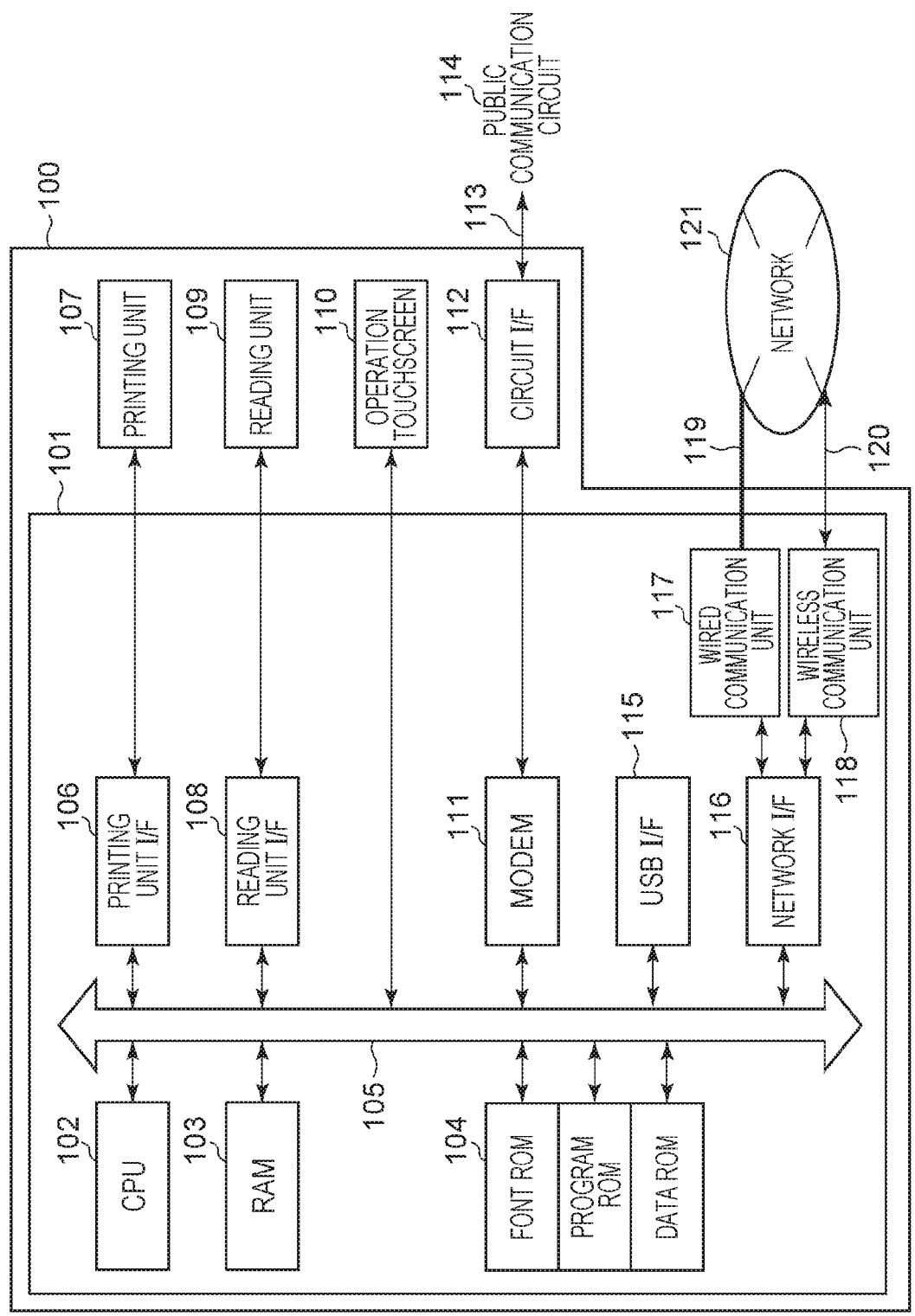
FIG. 1 is a block diagram illustrating the hardware configuration of an image forming apparatus according to an embodiment of the present disclosure.

FIG. 1 is a block diagram illustrating the hardware configuration of a multi-functional peripheral (MFP) 100 according to the present embodiment. Each block indicates a module, and an arrow between blocks indicates the flow of data or a command. At first, the MFP 100 will be described. The MFP 100 has functions to execute printing of received print data, transmission of electronic mail, copying of a document, and the like.

Although the MFP 100 is described as an example of an image forming apparatus in the present embodiment, the image forming apparatus is not limited to the MFP 100. For example, the image forming apparatus may be a single function peripheral (SFP) that executes processing using consumables, such as a single-function printer or a three-dimensional printer. The MFP 100 includes a printing unit 107, a reading unit 109, an operation touchscreen 110, a circuit interface (I/F) 112, and a controller unit 101 that controls these units.

The controller unit 101 includes a central processing unit (CPU) 102, random-access memory (RAM) 103, read-only memory (ROM) 104, and a printing unit I/F 106. The controller unit 101 further includes a reading unit I/F 108, a modem 111, a Universal Serial Bus (USB) I/F 115, and a network I/F 116, and each block is connected by a system bus 105. The CPU 102 comprehensively controls the above-mentioned blocks in accordance with various control programs. These various control programs are stored in a program area of the ROM 104, and are read and executed by the CPU 102. Alternatively, compressed data stored in the program area of the ROM 104 is decompressed and expanded into the RAM 103, and is executed by the CPU 102. Alternatively, the above-mentioned various control programs may be stored in a hard disk drive (HDD) (not illustrated) in a compressed/not compressed state.

The network I/F 116 communicates with a network 121 via a wired communication unit 117 or a wireless communication unit 118. This allows data reading and writing through access to the data ROM 104 or the like via the network 121.

The modem 111 establishes connection with a public communication circuit 114 via the circuit I/F 112, and performs communication processing with other image forming apparatuses, fax machines, telephones, and the like (not illustrated). The circuit I/F 112 and the public communication circuit 114 are generally connected by a telephone line 113.

The printing unit I/F 106 serves as an interface for outputting an image signal to the printing unit 107 (printer engine). In addition, the reading unit I/F 108 serves as an interface for receiving a read image signal from the reading unit 109 (scanner engine). The CPU 102 processes an image signal input from the reading unit I/F 109, and outputs the processed signal as a to-be-recorded image signal to the printing unit I/F 106.

Using font information stored in a font area of the ROM 104, the CPU 102 displays characters and symbols on a display section of the operation touchscreen 110, and receives command information from the operation touchscreen 110 on which user instructions are received.

In addition, apparatus information of the MFP 100, the user's phonebook information, department management information, and the like are stored by the CPU 102 in a data area of the ROM 104, and are read and updated as needed by the CPU 102.

Figure 2:
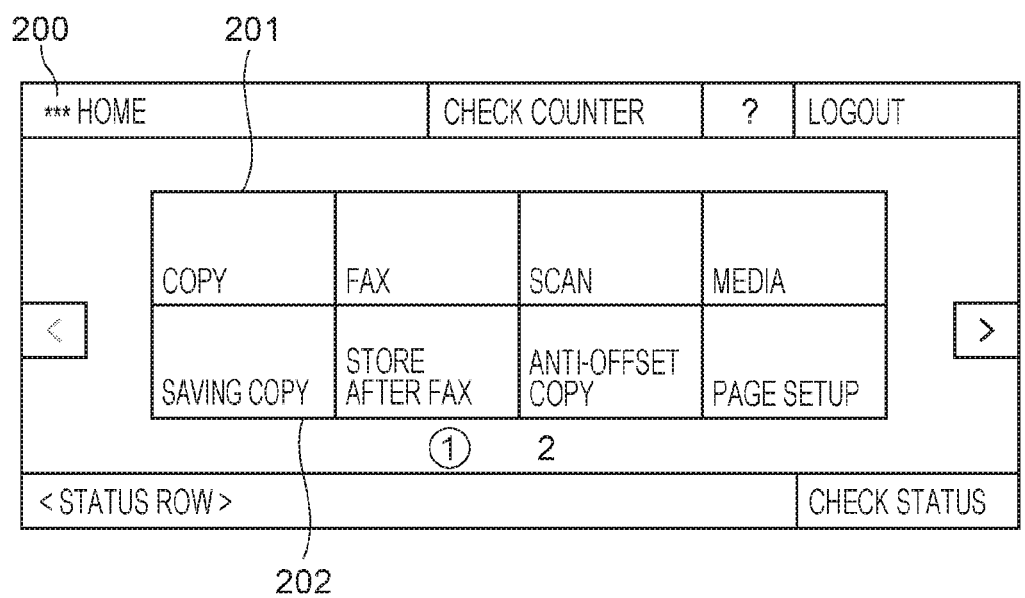
FIG. 2 illustrates an example of a home screen in the present embodiment.

FIG. 2 illustrates an example of a home screen 200 provided by the MFP 100. The home screen 200 is displayed upon activation of the MFP 100, and it becomes ready for the user to execute various existing functions and applications. There are buttons 201 with which transitions may be made to existing functions such as copy, fax, scan, media, and page setup. In contrast, there are buttons 202 with which transitions may be made to applications that are installable later via the network 121 or the like, and examples of these applications include saving copy, store after fax, and anti-offset copy. Applications such as saving copy, store after fax, and anti-offset copy are installable in addition to existing functions such as copy, fax, and scan.

The function of the store after fax application is as described above. The saving copy application is an application that, when the user touches once the icon 202 of the saving copy application displayed on the operation section, copying is executed with preset copy settings. For example, 2-in-1 page aggregation and monochrome copy are set as the copy settings, thereby saving toner and printing paper used in printing. In addition, the anti-offset copy application is copying that, when the user touches once the icon 202 of the anti-offset-copy application displayed on the operation section, prevents an image on the backside from being reflected on the frontside in the case of reading a document printed on both sides and printing the read document on both sides of paper. Although some applications may be installed later via a network, some other application may be pre-installed in the ROM 104.

FIG. 3 illustrates an example of a screen for copy operation provided by the MFP 100. In response to selection of the copy icon 201 on the home screen 200, the home screen 200 changes to a copy basic screen 300. The copy basic screen 300 is a screen on which copy settings are changeable, and a command may be given to execute a job.

Figure 4:
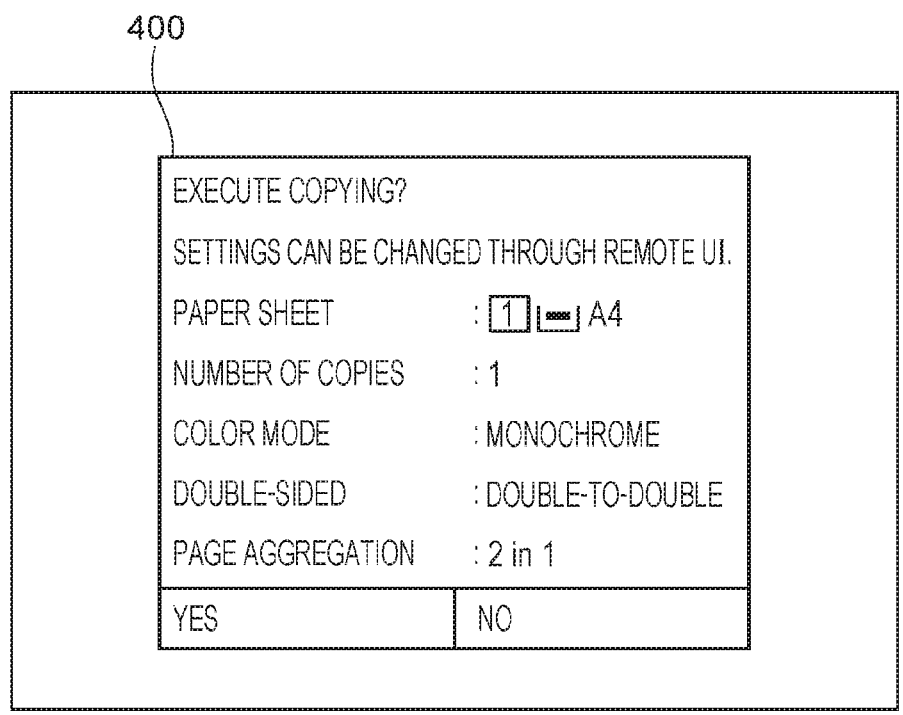
FIG. 4 illustrates an example of a screen upon execution of a saving copy application in the present embodiment.

FIG. 4 illustrates an example of a screen of the saving copy application provided by the MFP 100. In response to selection of the icon 202 of the saving copy application on the home screen 200, the home screen 200 changes to a saving copy application execution screen 400, which is a screen that displays set values set by the application and on which execution of copying is selectable.

FIG. 5 illustrates an example of a method for setting various applications provided by the MFP 100. Although this example is the case of a screen displayed on a browser of an information processing apparatus via the Internet 121, the settings may alternatively be made on the operation touchscreen 110. An application whose settings are to be changed is selectable on an application management screen 500. In response to selection of a link to a saving copy application 501 on the application management screen 500, the application management screen 500 changes to a saving copy button editing screen 502 on which the settings of the saving copy application are changeable. The saving copy button editing screen 502 is a screen on which settings 503 of a job to be executed by the saving copy application are editable. On this screen 502, settings upon execution of the application, such as 2-in-1 copy for saving ink and paper, are editable. This screen 502 includes a button 504 for switching between enabling and disabling of the use of settings of copying using an existing function. When the saving copy application is enabled, the use of copy settings may be restricted. In the present embodiment, because the normal copy function is disabled when the saving copy application is enabled, a copy operation based on a command of the copy icon 201 is disabled. That is, when the copy application is enabled, an operation of the existing copy function corresponding to the copy application is disabled. When the fax application is enabled, an operation of the existing fax function corresponding to the fax application is disabled. In addition, the application management screen 500 includes a button 505 for changing between enabling and disabling of an application. With this button 505, the state of an application is changeable. Although the saving copy application has been described here by way of example, the same applies to an application using fax or another application using scanning.

Figure 6:
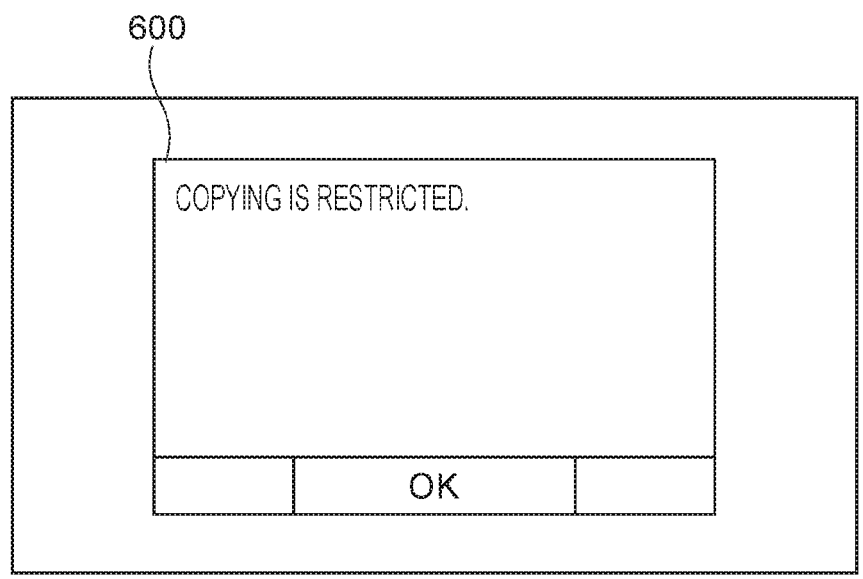
FIG. 6 illustrates an example of a screen when copying is restricted in the present embodiment.

FIG. 6 illustrates an example of a screen when a restriction on a normal copy operation provided by the MFP 100 is enabled. When the button 504 for switching between enabling/disabling of the settings of an existing function is disabled, pressing the button 201 for copying using an existing function on the home screen 200 allows transition to a copy restricted screen 600, which indicates that copying on the copy basic screen is unexecutable. In addition, pressing the button 202 for the saving copy application allows transition to the saving copy application execution screen 400, and copying becomes executable.

Figure 7:
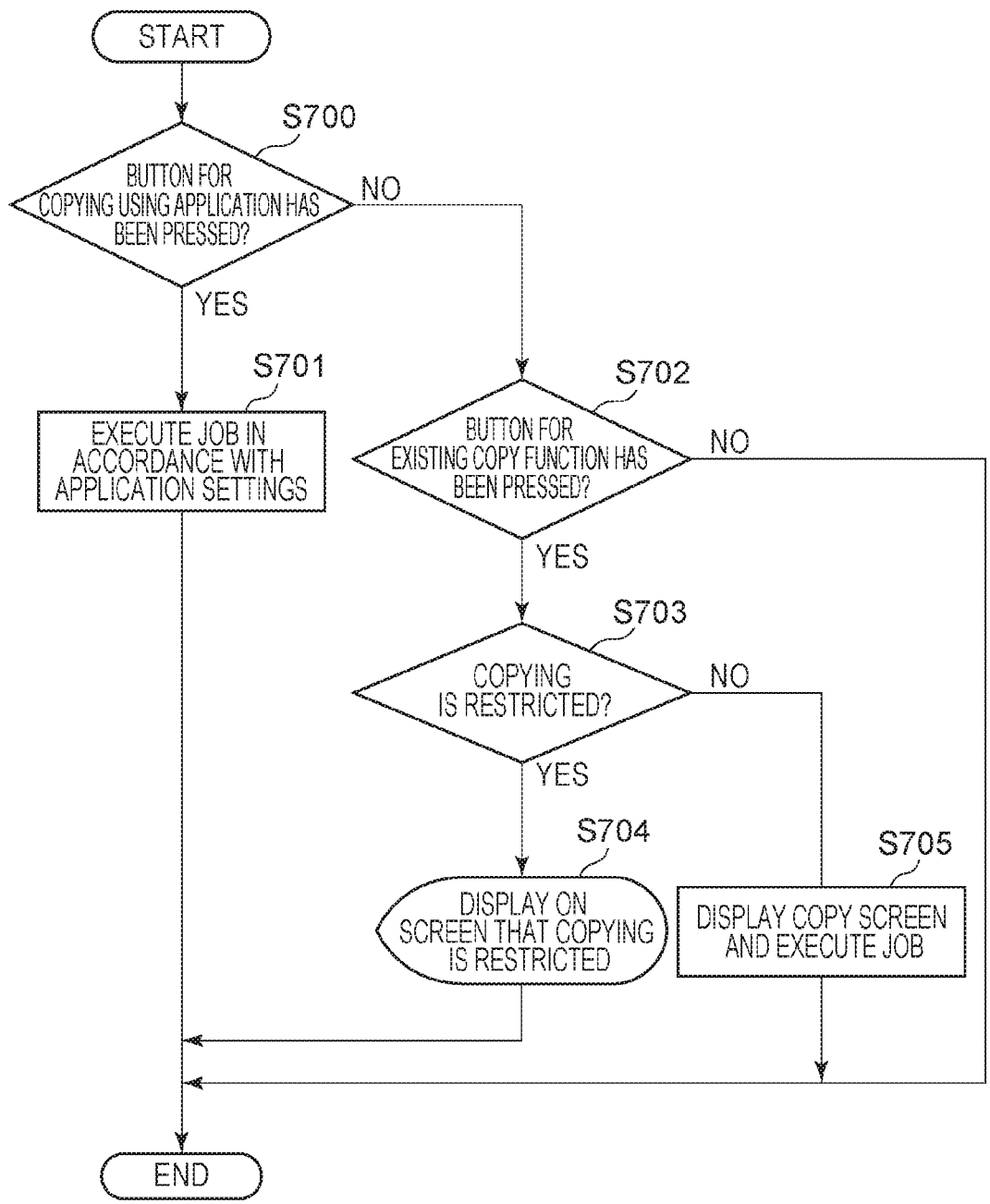
FIG. 7 is a flowchart when a function is restricted.

FIG. 7 is a flowchart of a process performed in response to running a program stored in the ROM 104 by the CPU 102 of the MFP 100. FIG. 7 is a flowchart of a process for restricting an existing function when an application is enabled.

Although the image forming apparatus according to the present embodiment is configured in such a manner that one CPU 102 executes each process indicated in the flowchart using one memory (RAM 103), other modes are possible. For example, a plurality of CPUs, RAMs, ROMs, and storages may cooperate to execute each process indicated in the later-described flowchart.

In S700, it is determined whether the button 202 for copying using an application has been pressed. In the case where the button 202 has been pressed, the process proceeds to S701. In the case where the button 202 has not been pressed, the process proceeds to S702.

In S701, the application execution screen 400 is displayed, a job is executed on the basis of set values set via the setting screen 503 of the to-be-executed job, and the process ends.

In S702, it is determined whether the button 201 for copying using an existing function has been pressed. In the case where the button 201 has been pressed, the process proceeds to S703. In the case where the button 201 has not been pressed, the process ends.

In S703, it is determined whether a restriction on a normal copy function is enabled or disabled when the saving copy application is enabled. In the case where the restriction is enabled, the process proceeds to S704. In the case where the restriction is disabled, the process proceeds to S705.

In S704, the screen 600 on which the function is restricted is displayed on the operation touchscreen 110. In S705, the copy basic screen 300 is displayed, which allows execution of copying with arbitrary set values.

In another embodiment different from the present embodiment, instead of displaying the function-restricted screen in S704, the copy basic screen 300 is displayed; and no problem occurs even with restrictions such as the job execution button being not pressable. In addition, this may alternatively be realized by not displaying the copy button 201 when the function is restricted.

Although the copy function has been described herein in the present embodiment, functions other than copying, such as a fax function and a scan transmission function, may similarly be restricted. With the above-described mechanism, an existing function may be restricted when a particular application is enabled.

According to the present disclosure, when an application installed in an image forming apparatus is enabled, execution of a function corresponding to the application may be restricted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-225482, filed Nov. 30, 2018, which is hereby incorporated by reference herein in its entirety.

What is claimed is:

1. An image forming apparatus comprising:
one or more processors; and
one or more memories storing executable instructions, which when executed by the one or more processors, cause the image forming apparatus to:
display a first button for executing a copy function on a screen;
install a copy application for the image forming apparatus;
display a second button for executing the installed copy application on the screen;
in response to selection of the second button from the screen, execute the copy application; and
restrict executing the copy function from the screen in a case where the copy application is enabled.

2. The image forming apparatus according to claim 1, wherein:
the copy application is an application for executing saving copying.

3. The image forming apparatus according to claim 1, wherein:
the copy application is an application installed upon activation of the image forming apparatus.

4. The image forming apparatus according to claim 1, wherein:
the copy application is executed in response to a command given once for the copy application via a display.

5. The image forming apparatus according to claim 1, wherein the executable instructions, when executed by the one or more processors, further cause the image forming apparatus to:
set copy settings of number of copies and density for the copy application.

6. The image forming apparatus according to claim 5, wherein copy processing is executed based on the copy settings, in response to selection of the copy button.

7. A method for controlling an image forming apparatus, the method comprising:
displaying a first button for executing a copy function on a screen;
installing a copy application for the image forming apparatus;
displaying a second button for executing the installed copy application on the screen;
in response to selection of the second button from the screen, executing the copy application; and
restricting executing the copy function from the screen in a case where the copy application is enabled.

8. The method according to claim 7, wherein:
the copy application is an application for executing saving copying.

9. The method according to claim 7, wherein:
the copy application is an application installed upon activation of the image forming apparatus.

10. The method according to claim 7, wherein:
the copy application is executed in response to a command given once for the copy application via a display.

11. The method according to claim 7, further comprising:
setting copy settings of number of copies and density for the copy application.

12. The method according to claim 11, wherein copy processing is executed based on the copy settings, in response to selection of the button.

13. A non-transitory computer-readable storage medium storing a program including executable instructions, which when executed by one or more processors of an image forming apparatus, cause the image forming apparatus to perform a method comprising:
displaying a first button for executing a copy function on a screen;
installing a copy application for the image forming apparatus;
displaying a second button for executing the installed copy application on the screen;
in response to selection of the second button from the screen, executing the copy application; and restricting executing the copy function from the screen in a case where the copy application is enabled.

* * * * *